March 30, 1965  M. H. BUTTERFIELD ETAL  3,175,776
APPARATUS FOR TEMPORARILY STORING ELONGATE MATERIAL
Filed Oct. 23, 1961  2 Sheets-Sheet 1

INVENTORS
M. H. Butterfield
G. M. Boxall
BY

ATTORNEY

United States Patent Office 3,175,776
Patented Mar. 30, 1965

3,175,776
APPARATUS FOR TEMPORARILY STORING
ELONGATE MATERIAL
Michael Hughes Butterfield and Genefer Margaret Boxall,
London, England, assignors to The British Iron and
Steel Research Association
Filed Oct. 23, 1961, Ser. No. 146,870
2 Claims. (Cl. 242—55.01)

This invention relates to the storage of elongate material and more particularly to the temporary storage of such material in motion.

It is sometimes desired to accumulate moving elongate material temporarily at some point in its path to perform an operation on the material without interrupting the flow through the line. For example, in a continuous annealing plant at the beginning or the end of a line the ends of two coils are stopped temporarily for welding together and it is desirable that the flow or strip through the remainder of the line should not be interrupted by this procedure.

One object of the present invention is to provide an improved storage means suitable for use in the above circumstances.

In similar circumstances difficulty may arise due to increased tension in the strip or undesirable length and weight of strip between two points of the line and this can arise as a result of differences between strip speeds at the two points.

Another object of the invention is to obviate the latter difficulty.

According to one aspect of the present invention therefore, there is provided a method of storing moving elongate material which comprises passing the material around two sets of bearing surfaces along a continuous path including two interleaved, spiral-form portions, and arranging one set of such surfaces to be movable relative to the other.

According to another aspect there is provided apparatus for storing moving elongate material comprising two sets of bearing surface means one of which sets is movable relative to the other, and which sets are so arranged that elongate material may be passed along a continuous path therearound having two interleaved, spiral-form portions.

In another aspect the invention provides apparatus for storing moving elongate material comprising two sets of bearing surface means, a first set including two or more such means of successively increasing dimensions and located one within the other relative to the path of the elongate material, the second set including one or more such means arranged in similar manner to the first set but inverted relative thereto, and one of said sets of bearing surface means being movable relative to the other.

In a preferred form the invention makes use of fluid bearing surface means such as described in our U.S. patent specification No. 3,097,971.

For a clearer understanding of the present invention the same will now be more fully described by way of example with reference to the accompanying drawings, in which.

Figure 1:
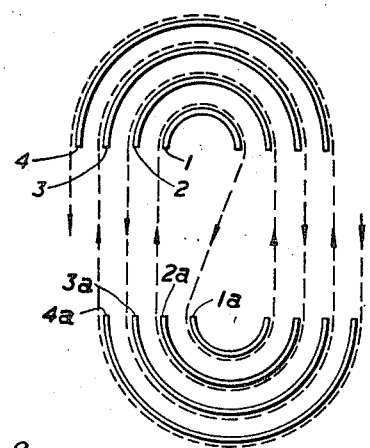
FIGURE 1 illustrates one embodiment of the present invention.
Figure 2:
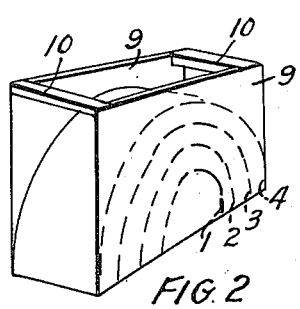
FIGURE 2 illustrates in part one form of bearing support structure for use in the embodiment of FIGURE 1.
Figure 3:
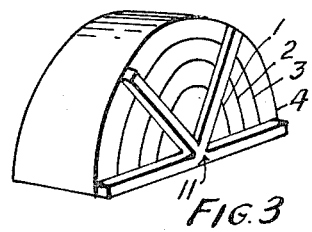
FIGURE 3 illustrates an alternative bearing support structure to that of FIGURE 2.

The embodiment of FIGURE 1 comprises two sets of bearing surfaces 1, 2, 3 . . . and 1a, 2a, 3a . . . respectively, the individual members of each set being of open cylindrical form and successively increasing in cross-sectional dimensions, as shown. The members of each set are arranged one within the other of next greater dimensions, and this relative disposition of members within each set will be maintained by suitable side support members and/or framework. One form of suitable support is indicated by FIGURE 2 in which the upper bearing set 1–4 of FIGURE 1 is shown located between sheets 9 to which the bearings are connected, the sheets themselves being additionally connected at corresponding upper corners through cross members 10. FIGURE 3 indicates an alternative form of support using a pair of radial arm structures 11 between which the bearings are connected, one of the structures 11 being obstructed in the view taken.

Figure 4:
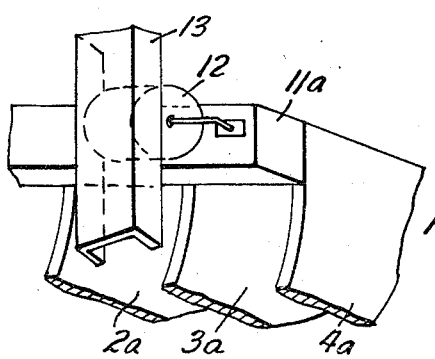
FIGURE 4 illustrates further detail of a support structure such as in FIGURE 3 for use with a movable bearing set.

Also, the two bearing sets are arranged with their linear edges in mutually facing disposition and displaced in phase, as it were. Again, as discussed below, the lower bearing set is movable relative to the upper set and for this purpose it may be convenient to support the bearing sets by a common framework within which the upper set is fixed and the lower set is mounted for vertical movement by the provision of sliders or rollers for engagement in cooperating tracks. The side support members mentioned above may still be used and FIGURE 4 shows the case of the lower bearing set of FIGURE 1 with radial arm support members 11 according to FIGURE 3 and provided with rollers such as 12 engaging a U-section track 13 forming part of the common framework.

Elongate material is passed around the bearing members along the path indicated in broken line and it will be seen that this path is constituted by two interleaved, coplanar, spiral-form portions joined at the centre point of the path portion between surfaces 1 and 1a.

The upper bearing set is fixed and the lower bearing is free to move, under gravity, towards and away from the upper set over a fixed range. If then, at any time during the passage of material through the store, the rate at which material enters the store exceeds that at which it is withdrawn from the store, the lower bearing set appropriately moves away from the upper set to take up the excess material until one or other of the rates is suitably corrected. Similarly, if at any time the rate of withdrawal of material from the store exceeds the rate of supply to the store, the lower bearing set rises until one or other of the rates is corrected to equalise the supply and demand. Clearly, the lower bearing set is stationary during times of equal material feeding and withdrawal rates.

It will be seen therefore that the store acts as a reservoir the capacity of which automatically varies to compensate for differences in supply and demand of material until these are equalised.

In the case where the invention is employed to compensate for temporary stoppage it will be normal to initiate operation with the lower bearing set at the lowest point of its range of movement so that the maximum adjustment may be made. In the case where there may be adjustment in both directions operation is initiated with the lower bearing set at an appropriate intermediate point of its range dependent on the demands likely to be made for adjustment in either direction.

Figure 5:
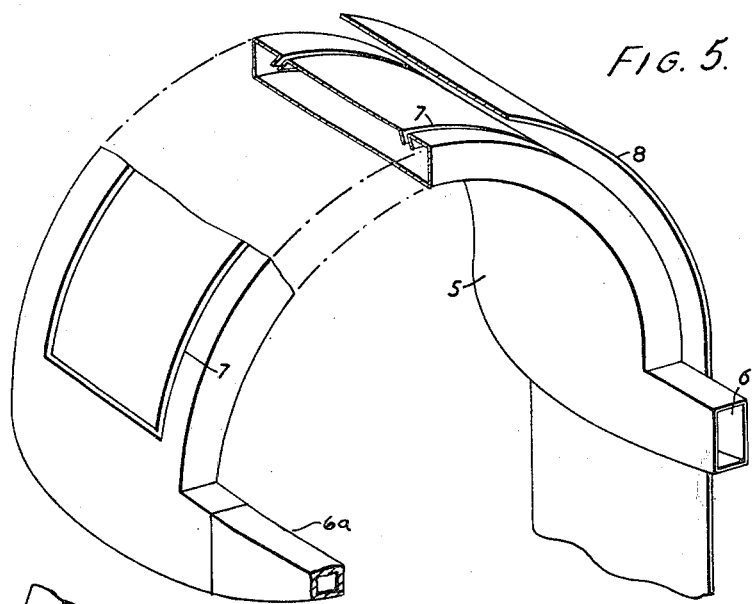
FIGURE 5 illustrates one embodiment of fluid bearing surface means for use with the invention.

As mentioned above the bearing surfaces of this invention are preferably in the form of fluid bearings and FIGURE 5 shows one embodiment of a single bearing surface means of such form.

The fluid bearing structure 5 of FIGURE 5 is of hollow construction, and is provided with fluid inlet ports 6 at the lower side edges and a peripheral fluid outlet slit 7. Bearing fluid is supplied to ports 6 by pipes 6a, one of which is indicated in FIGURE 5, and such pipes will normally be flexible, at least in part, although this is not essential in the case of the fixed upper bearing set. When elongate material, such as strip material 8 is passed around bearing 5 fluid emerging from slit 7 forms a pressurised cushion between the strip 8 and the bearing surface to support the strip out of contact with the structure 5.

Figure 7:
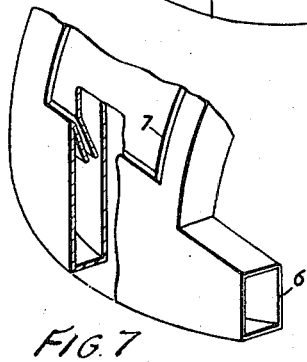
FIGURE 7 illustrates a part of the FIGURE 5 embodiment with cut-away detail.
Figure 6:
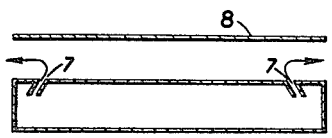
FIGURE 6 illustrates schematically the fluid flow operation of the FIGURE 5 embodiment.

In an advantageous arrangement of such a fluid bearing structure, the slit 7 is angled away from the adjacent edges of the bearing surface for increased efficiency as shown more clearly in FIGURES 6 and 7. However, it will be appreciated that FIGURE 5 shows only one example of a suitable fluid bearing structure, and the design of such structures, when employed, may be varied as appropriate without departing from the benefit of the invention.

Figure 8:
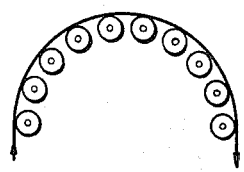
FIGURE 8 illustrates one embodiment of a suitable roller form of bearing surface means for the invention.

Also, although fluid bearing means are preferred other suitable forms of such means may be employed in the practical application of the present invention, and FIGURE 8 illustrates one such alternative form. More particularly, FIGURE 8 shows a single bearing surface means constituted by a number of small rollers disposed side-by-side in arcuate form.

Figure 9:
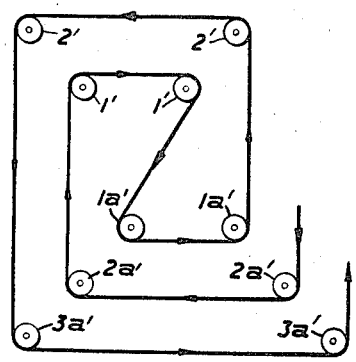
FIGURE 9 illustrates a simplified roller form of bearing surface means.

Although in the above examples use has been made of bearing surfaces of open-cylindrical form, the invention is not intended to be limited thereby. Thus FIGURE 9 shows a further form of the invention in which each set of bearing surface means comprises pairs of spaced rollers, the spacing of successive pairs of rollers in each set being increased from inside to outside relative to the path configuration. The reference numeral notation corresponds to that of FIGURE 1 with the addition of a prime (') to distinguish therefrom.

Instead of pairs of rollers, pairs of quadrant-section fluid bearing structures may equally well be employed, for example.

It will of course be appreciated that the illustrated embodiments are only shown in simple schematic manner to convey the operation of the invention. Thus the bearing surface means of each set will be linked one with another in practice and a self-adjusting linkage may be employed between the two sets. Also, additional features such as guides may be employed to obviate lateral movement of the material when moving through the store.

One of the main advantages of the present invention is that it affords a saving in space as compared to a "serpentine" looping arrangement. Thus, where there is a minimum radius requirement for each loop, as long as the central, smallest bearing member of each set meets this requirement then the intermediate and outer bearing members automatically meet the requirement, whilst at the same time the spacing between successive members is only determined by the thickness of material to be accommodated together with a suitable clearance. The overall width of a set of $n$ members may therefore be considerably smaller than $2n$ times the minimum radius which would be the approximate minimum width of a "serpentine" looping arrangement of equivalent capacity, disregarding clearances.

Furthermore, a greater length of material may be supported by the bearing surfaces, such as in FIGURES 1, 5 and 8, so that the load per unit area of surface is reduced for a given material.

The individual bearing surface means may be of any suitable form, although it will generally be desirable that the surfaces are of such form that the path of material passing between successive surfaces is tangential to the surface.

We claim:

1. Apparatus for storing elongate material comprising two sets of arcuate supports having an axial length of the same order as the width of said material, the outer surface of each support being formed as a bearing surface affording a smooth path for travel of said material thereacross, and each set including a plurality of substantially parallel supports of successively increasing arcuate length arranged in spaced disposition, each within the support of next increasing arcuate length, with the bearing surfaces of the two sets facing away from each other, and one of said sets being mounted for movement toward and away from the other while the apparatus is in use, the spacings between successive supports in each set being equal, with the supports of the different sets symmetrically disposed about respectively different but parallel medial planes, the spacing between said planes being equal to that between successive supports.

2. Apparatus as claimed in claim 1 in which said supports are hollow arcuate containers, said bearing surfaces being formed on the outer arcuate walls thereof, each container being provided with fluid inlet means and with fluid outlet means positioned in the peripheral portion of said outer arcuate wall and inclined toward the center of the bearing surface thereon.

References Cited by the Examiner

UNITED STATES PATENTS

| | | | |
|---|---|---|---|
| 1,449,515 | 3/23 | Kucharski | 242—55.19 |
| 1,553,903 | 9/25 | Lefebvre | 242—77.1 |
| 2,044,267 | 6/36 | Wiggins | 242—55.01 |
| 2,318,316 | 5/43 | Lawrence | 242—55.19 X |
| 2,624,573 | 1/53 | Rice | 242—55.19 |

FOREIGN PATENTS 19,817   8/97   Great Britain.

MERVIN STEIN, *Primary Examiner.*

HARRISON R. MOSELEY, RUSSELL C. MADER,
*Examiners.*